United States Patent
Bellemore et al.

[11] Patent Number: 6,088,728
[45] Date of Patent: Jul. 11, 2000

[54] SYSTEM USING SESSION DATA STORED IN SESSION DATA STORAGE FOR ASSOCIATING AND DISASSOCIATING USER IDENTIFIERS FOR SWITCHING CLIENT SESSIONS IN A SERVER

[75] Inventors: John Bellemore, San Francisco; Debashish Chatterjee, Freemont; Amit Jasuja, Belmont, all of Calif.

[73] Assignee: Oracle Corporation, Redwood Shores, Calif.

[21] Appl. No.: 08/873,057

[22] Filed: Jun. 11, 1997

[51] Int. Cl.[7] ............................ G06F 15/16; G06F 15/173
[52] U.S. Cl. ........................ 709/227; 709/228; 709/225; 709/226; 709/229; 709/238; 709/242
[58] Field of Search ................................ 395/325, 727, 395/188.01, 200.77, 650, 200.53; 370/401; 380/21; 709/227, 228, 229, 225, 226, 238, 242

[56] References Cited

U.S. PATENT DOCUMENTS

| | | | |
|---|---|---|---|
| 4,586,134 | 4/1986 | Norstedt | 364/200 |
| 4,664,528 | 5/1987 | Ahmad et al. . | |
| 4,823,122 | 4/1989 | Mann et al. . | |
| 5,047,922 | 9/1991 | Borkar . | |
| 5,247,671 | 9/1993 | Adkins et al. | 395/650 |
| 5,289,461 | 2/1994 | De Nijs . | |
| 5,319,754 | 6/1994 | Meinecke et al. | 395/325 |
| 5,392,285 | 2/1995 | Kurts . | |
| 5,448,559 | 9/1995 | Hayter et al. . | |
| 5,530,905 | 6/1996 | Nichols et al. . | |
| 5,553,242 | 9/1996 | Russell et al. . | |
| 5,596,745 | 1/1997 | Lai et al. . | |
| 5,598,536 | 1/1997 | Slaughter, III et al. . | |
| 5,600,722 | 2/1997 | Yamaguchi et al. | 380/21 |
| 5,617,540 | 4/1997 | Civanlar et al. . | |
| 5,633,861 | 5/1997 | Hanson et al. . | |
| 5,642,515 | 6/1997 | Jones et al. | 395/727 |
| 5,682,534 | 10/1997 | Kapoor et al. . | |
| 5,684,800 | 11/1997 | Dobbins et al. | 370/401 |
| 5,734,659 | 3/1998 | Mann et al. . | |
| 5,740,175 | 4/1998 | Wakemann et al. . | |
| 5,761,507 | 6/1998 | Govett . | |
| 5,771,349 | 6/1998 | Picazo, Jr. et al. | 395/188.01 |
| 5,774,660 | 6/1998 | Brendel et al. . | |
| 5,790,800 | 8/1998 | Gauvin et al. . | |
| 5,805,816 | 8/1998 | Picazo, Jr. et al. | 395/200.53 |
| 5,805,827 | 9/1998 | Chau et al. | 395/200.77 |
| 5,805,920 | 9/1998 | Sprenkle et al. . | |
| 5,828,879 | 10/1998 | Bennett . | |
| 5,944,823 | 8/1999 | Jade et al. . | |
| 5,963,556 | 10/1999 | Varghese et al. . | |
| 5,974,463 | 10/1999 | Warrier et al. . | |
| 5,978,849 | 11/1999 | Khanna . | |
| 5,987,430 | 11/1999 | Van Horne et al. . | |
| 6,006,264 | 12/1999 | Colby et al. . | |

*Primary Examiner*—Le Hien Luu
*Attorney, Agent, or Firm*—Law Offices of Charles E. Gotlieb

[57] ABSTRACT

A method and apparatus allows clients to share ports on a server. The server can maintain more sessions than server ports. When a client sends a command directed to the server, a resource manager inserted between the clients and the server intercepts the command and directs the server to select the session associated with a client prior to or at the same time that the resource manager forwards the intercepted command to the server. Responses from the server are forwarded by the resource manager to the client that sent the command to which the response relates. The resource manager may be coupled to multiple clients, and one or more ports of one or more servers.

17 Claims, 14 Drawing Sheets

SYSTEM USING SESSION DATA STORED IN SESSION DATA STORAGE FOR ASSOCIATING AND DISASSOCIATING USER IDENTIFIERS FOR SWITCHING CLIENT SESSIONS IN A SERVER

RELATED APPLICATIONS

The subject matter of this application is related to the subject matter of application Ser. No. 08/873,385 entitled, "Method and Apparatus for Reducing the Number of Data Requests Made to a Server" filed on Jun. 11, 1997, now pending, by Debashish Chatterjee, Luxi Chidambaran and Mohammad S. Lari and to the subject matter of application Ser. No. 08/873,644 entitled, "Method and Apparatus for Reducing Inefficiencies Caused by Sending Multiple Commands to a Server" filed on Jun. 11, 1997, now pending, by Debashish Chatterjee, Luxi Chidambaran, and to the subject matter of application Ser. No. 08/872,529 entitled, "Method and Apparatus for Coupling Clients to Servers" filed on Jun. 11, 1997, now pending, by Debashish Chatterjee, John Bellemore and Amit Jasuja, each having the same assignee as this application and each is incorporated herein by reference in its entirety.

FIELD OF THE INVENTION

The present invention relates to computer software, and more specifically to client-server computer software.

BACKGROUND OF THE INVENTION

Where a single repository of data is shared by many users, a client-server architecture may be employed. Referring now to FIG. 1, four computers 110, 112, 114, 116 arranged using a client-server architecture are illustrated. In a client-server architecture, a server 110 is used to access a data repository storage device 102 that stores the data that is shared among the clients 112, 114, 116. Users of the client-server system 100 use a client 112, 114 or 116 to communicate with the server 110 to access the shared data stored in the storage device 102. Clients 112, 114, 116 do not have direct access to the data in the storage device 102, but may request that the server 110 perform actions such as performing retrievals using queries, or adding to or changing the data stored in the storage device 102.

Each client 112, 114, 116 is coupled to the server 110 by a connection 122, 124, 126 between the clients 112, 114, 116 and the server 110. Each connection 122, 124, 126 may be physically separate as shown in FIG. 1, or may be shared using a local area network, or LAN. Ports 142, 144, 146 and associated cabling connected to each of the clients 112, 114, 116 provide the OSI layers 1 and 2 connectivity to the ports 132, 134, 136 of the server 110. If the server 110 will communicate with each client 112, 114, 116 over a LAN, a single LAN interface port may physically replace ports 132, 134, 136, and ports 132, 134, 136 are treated as logical ports.

Referring now to FIG. 2, the conventional server 110 of FIG. 1 is shown in more detail. A server 110 may be built from conventional server software 210 that runs using a conventional operating system 212 on a conventional computer system 214. A SparcCenter 2000 running the Solaris operating system commercially available from Sun Microsystems of Mountain View, Calif. is one computer system and operating system that may be used, among others. Server software 210 may be conventional database server software such as the Oracle7 product commercially available from Oracle Corporation of Redwood Shores, Calif., or other types of server software.

Referring now to FIGS. 1 and 2, each client 112, 114, 116 communicates with the server 110 by establishing a connection 122, 124 or 126 between the respective client 112, 114 or 116 and the server 110. Each connection 122, 124, 126 is established through conventional data communications means, controlled on the server 110 by the server operating system 212. Each client 112, 114, 116 may establish and maintain one or more simultaneous connections to the server 110 depending on the capabilities of the operating system 212 and the physical capabilities of each client 112, 114, 116 and the server 110. When a connection is established, conventional server software 210 establishes a process to handle communications over the connection and to execute commands received, and maintains information about the process during the period in which the connection is maintained. The process is associated with the port 132, 134 or 136 that was used to establish the session, and all communications received from that port 132, 134 or 136 are routed to that process by the operating system 212, the server software 210 or both.

To allow a user to access the data in the server 110 from any client 112, 114, 116, the user establishes a session with the server 110, by identifying himself to a client 112, 114 or 116, for example, by using a user identifier and password. The client 112, 114 or 116 passes this information to the server 110. Using its software 210, the server 110 checks an access table 218 maintained by a database administrator for validity of the user identifier and password, and if valid, a session is established by the server 110. For each port 132, 134, 136 over which a process of the server software 210 and a session of the user has been established, the server 110 maintains data about the session in a session data storage 232, 234 or 236 in a storage device such as a memory or hard disk. The session data storage 232, 234 or 236 may contain the user identifier and state information for the database, such as instances of object types, language and character set data, statistics about resource usage for the session, storage for cursors and variables and other information. Subsequent commands received by the process over a port 132, 134, 136 are assumed by the server 110 to come from the user that last established a session via that port until such session is terminated. In this manner, the session, process and port 132, 134 or 136 are associated with each other. The process looks to the data in the session data storage 232, 234 or 236 corresponding to the process to execute the commands it receives. When the user logs out, the process is terminated and other users may log into the server using the same port as was previously used, establish a connection, process and session on the server 110 and send commands to the server 110 for execution.

The server software 210 may limit access to the information it serves based on the user identifier stored in the session data storage 232, 234 or 236 corresponding to the process accepting the command. For example, a user of conventional database server software 210 may have no access to one set of data, read-only access to a second set of data, and read and write access to a third set of data. The server software 210 manages the access to the data stored in the storage device 102 by comparing the user identifier stored in the session data storage 232, 234 or 236 for the process with data stored in an access table 218 defined and maintained by a database administrator that identifies to which data each user or groups of users have access, and the type of access, read only or read and write access.

Each connection 122, 124 or 126 between the server 110 and the clients 112, 114 or 116 requires resources on the server 110 such as memory to manage the process and the connection 122, 124 or 126 associated with the session. Even a user that maintains a session without requesting the server to perform any action uses these resources. In order to conserve these resources, some conventional operating systems 212 running in the computer that runs the server software 210 impose a limit on the number of connections 122, 124, 126 that may be simultaneously maintained. Other conventional operating systems 212 may not impose a limit on the number of such connections 122, 124, 126, but a large number of connections 122, 124, 126 over which sessions are established can hinder the other processes on the server 110 which have to run using the remaining resources.

Some users that do not perform many transactions with the server 110 may wish to have the client 112, 114, 116 that they use continuously maintain a session with the server 110 even during periods during which they will not be communicating with the server 110, because it is cumbersome or expensive to establish a connection with the server 110, thus establishing the session takes time and resources that the user may wish to expend no more than once each day. Because such users utilize resources of the server 110 maintaining the session and the associated process and connection, they may either prevent other users from accessing the limited number of connections allowed by the operating system 212, or needlessly tie up resources of the server 110, reducing resources available to the other active or potential users of the server 110.

TP monitors have been developed to allow more users to use a server 110 than the number of connections established with the server 110. Referring now to FIGS. 1, 2 and 3, the system 100 of FIG. 1 is shown with a TP monitor 310 connected between the clients 112, 114, 116 and the server 110 using ports 338 and 332, 334, 336. The TP monitor 310 acts to the server 110 like one or more clients and acts to the clients 112, 114, 116 like one or more servers, allowing its insertion between the clients 112, 114, 116 and the server 110 without modification of the clients 112, 114, 116 or the server 110. The TP monitor 310 establishes one or more sessions with the server 110 with full security access privileges using a user identifier and password of the TP monitor 310. Each of these sessions is therefore "owned" by the TP monitor 310. The TP monitor 310 receives queries or other server command from the clients 112, 114, 116, passes the query or command to the server 110 over one of its connections 328 to the server 110, accepts any results of the query or command from the server 110 and passes the results to the initiating client 112, 114 or 116. Because the TP monitor 310 is capable of switching the commands received from the clients 112, 114, 116 over a smaller number of connections with the server 110, the TP monitor can be connected to more clients 112, 114, 116 than the number of connections it occupies on the server 110, overcoming the limitations of the number of server connections and reducing the resources of the server 110 that would otherwise be required to maintain individual connections to all of the clients 112, 114, 116. In FIG. 3, a single connection 328 on the server 110 may handle commands from all three clients 112, 114, 116.

However, because the TP monitor 310 must have security privileges on the server 110 for at least all of the clients 112, 114, 116 from which it may receive commands, and the connection is "owned" by the TP monitor 310, the server 110 is never informed of the identity of the user of the client 112, 114 or 116 that sent the command the server 110 receives. Thus, the server 110 is unable to restrict data access according to the identity of the user.

The TP monitor 310 may itself perform the security functions that were performed by the server 110. The TP monitor 310 may perform these functions by requiring the user to establish a session with the TP monitor 310 similar to the procedure for establishing a session with the server described above. Because the TP monitor 310 is aware of the user identifier of the user that sends any command, the TP monitor 310 can maintain its own data access table and refuse to pass to the server 110 a query or other command sent by a user without the proper access privileges. However, because there may be numerous TP monitors 310 coupled to each server 110, administration of security access can be made more complex than the centralized approach of administering security on the server 110. In addition, the TP monitor 310 may not be able to provide all of the security features of the server 110. Furthermore, when new security features become available on the server 110, the owner of the system 100 is required to update the software in the TP monitor 310 to gain access to these new features if such features can be obtained from the TP monitor 310 at all.

It is desirable to allow more users to use the server 110 than connections to the server 110 in a manner that maintains to the server 110 the identity of the user.

SUMMARY OF INVENTION

In accordance with the present invention, a server may maintain more sessions than ports or processes, and accept commands to associate a session with a port and its corresponding process, thereby allowing sessions to share ports and processes. A resource manager, which may be coupled between one or more ports of one or more servers and multiple clients, can direct a server to initiate sessions with each of the clients to which it is attached. When the resource manager receives queries or other server commands from the clients to which it is attached, it directs the server to associate with a port the session data associated with the client from which the query or other command was received, and then sends the query or other command to the server over that port. The server can use the security and state information contained in the session information that is associated with the port and process at that time to determine if and how to process the query and any subsequent query over the same connection until the session data associated with the port is changed or the connection is terminated. Like the TP monitor approach, the number of connections to the server required for multiple clients to communicate with the server can be less than the number of clients capable of such communication with the server. However, unlike the TP monitor approach, the identity of the user is available to the server for security access purposes.

DETAILED DESCRIPTION OF A PREFERRED EMBODIMENT

Figure 1:
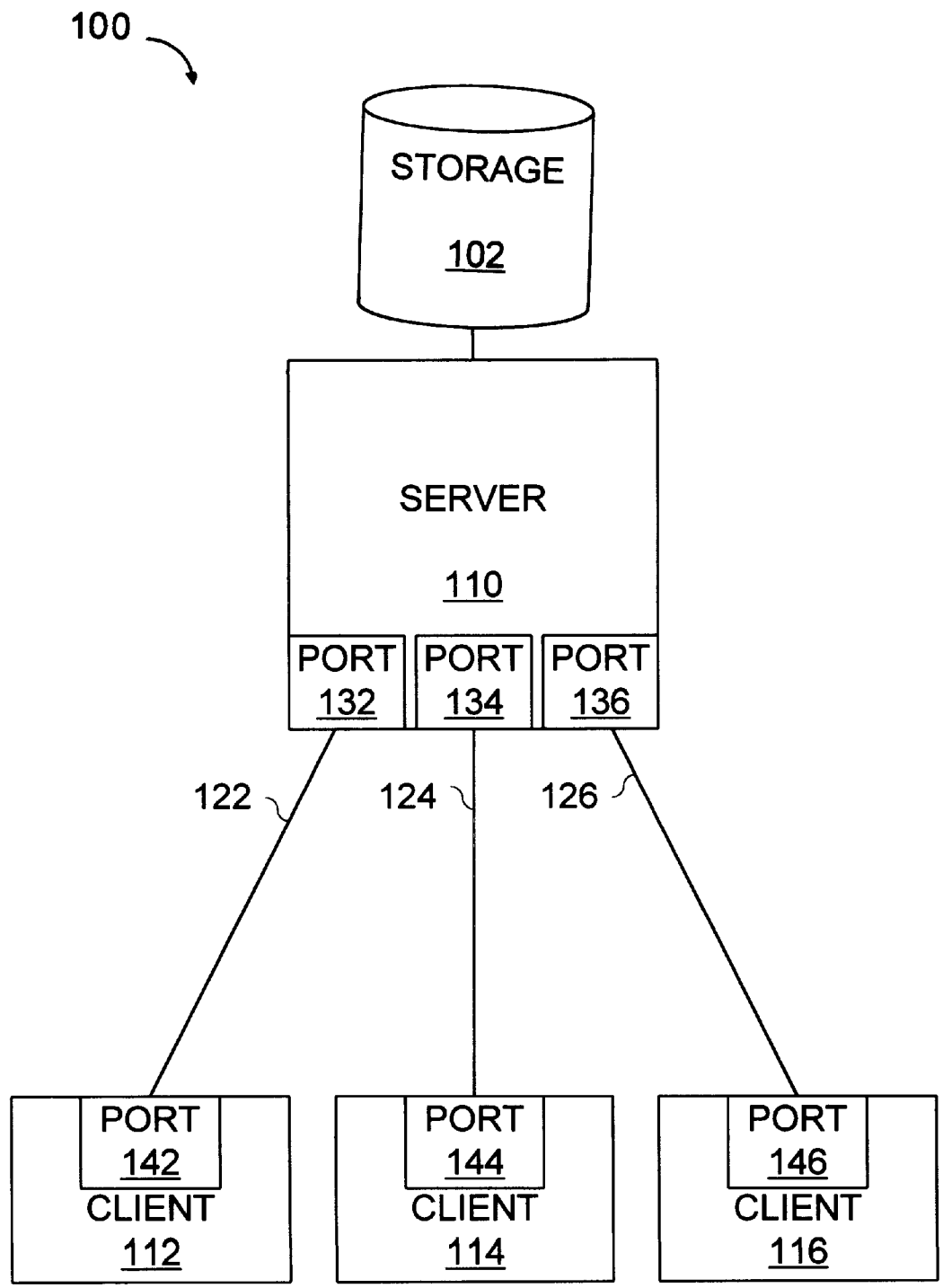
FIG. 1 is a block schematic diagram of four computers and a storage device coupled in a conventional client-server architecture.
Figure 4A:
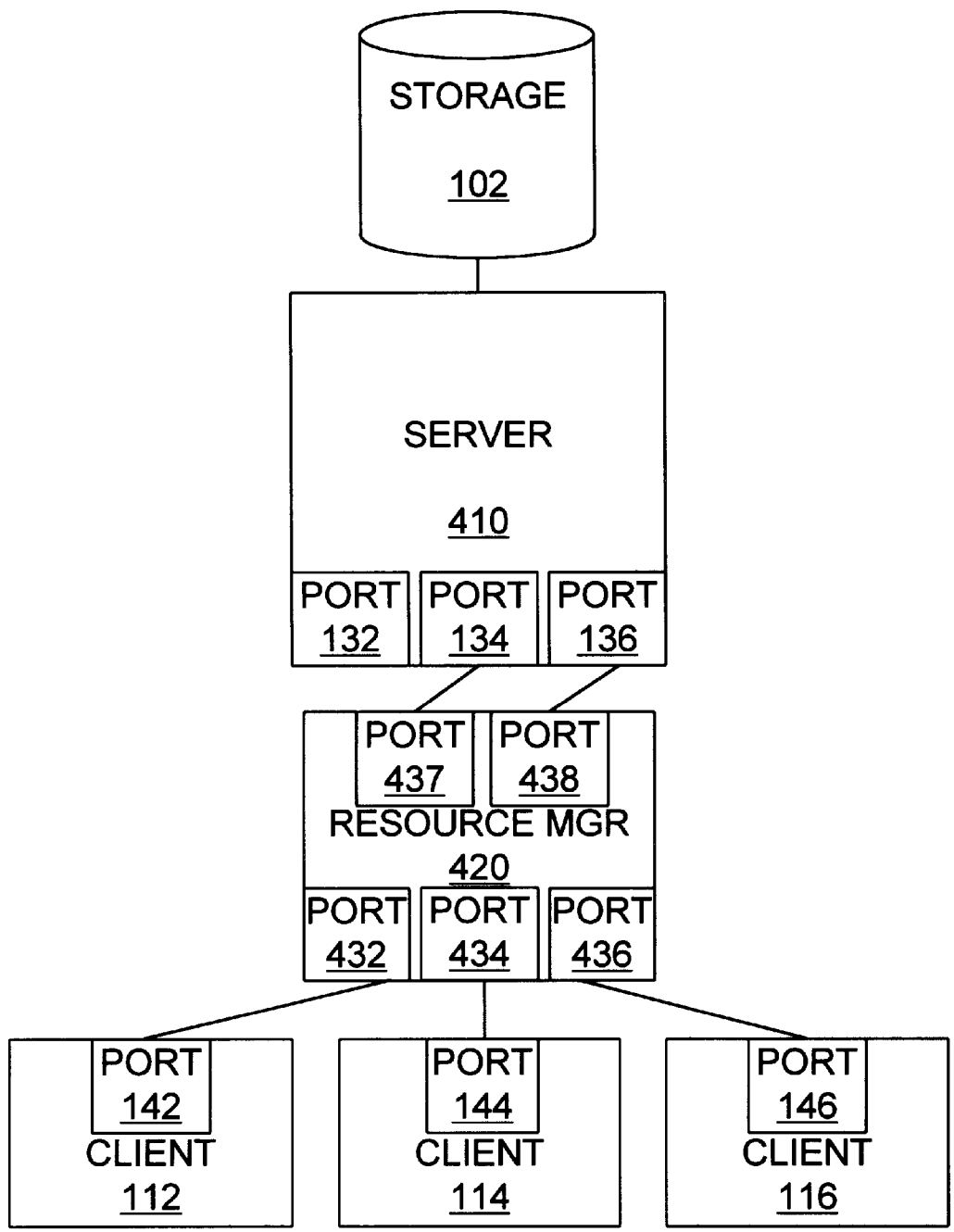
FIG. 4A is a block schematic diagram of a client-server architecture using a resource manager according to one embodiment of the present invention.

Referring now to FIG. 4A, a client-server architecture according to one embodiment of the present invention is shown. Clients 112, 114, 116 and storage 102 operate as described above with reference to FIG. 1. Server 410 operates similarly to server 110 of FIG. 1 with the enhancements described below to allow the server 410 to maintain multiple sessions per port and process. One of these sessions may be designated as the "active session" for each port pair, by sending to the server 410 commands that switch the active session designation among the sessions it maintains to associate the session designated in the command with the port. The server 410 uses the session data corresponding to the active session of a port to process commands received on that port until a new session is designated as active.

Resource manager 420 forwards commands from clients 112, 114, 116 to server 410 and responses from server 410 to clients 112, 114, 116 as described below. If a command is received by resource manager 420 from a user different from the user that sent the prior command, the resource manager 420 directs the server 410 to designate the session corresponding to the user sending the new command as an active session for a port before sending the command from such user over the port as described below.

In one embodiment, the present invention is implemented as computer software running on conventional computer systems, with one or more systems acting as one or more servers, one or more systems acting as one or more resource managers and one or more systems acting as one or more clients, although other implementations may be used. Computer software may be implemented as one or more modules as described herein, however the term "module" is not intended to mean that the functions described herein be grouped as described, as any alternate grouping of functions may be substituted to practice the present invention. As an example embodiment, the arrangement shown in FIG. 4A may utilize five different computer systems, one each for the server 410 and resource manager 420, and one for each of the three clients 112, 114, 116. In another embodiment, the resource manager 420 and one of the clients 112, 114 or 116 share a single computer system.

Figure 4B:
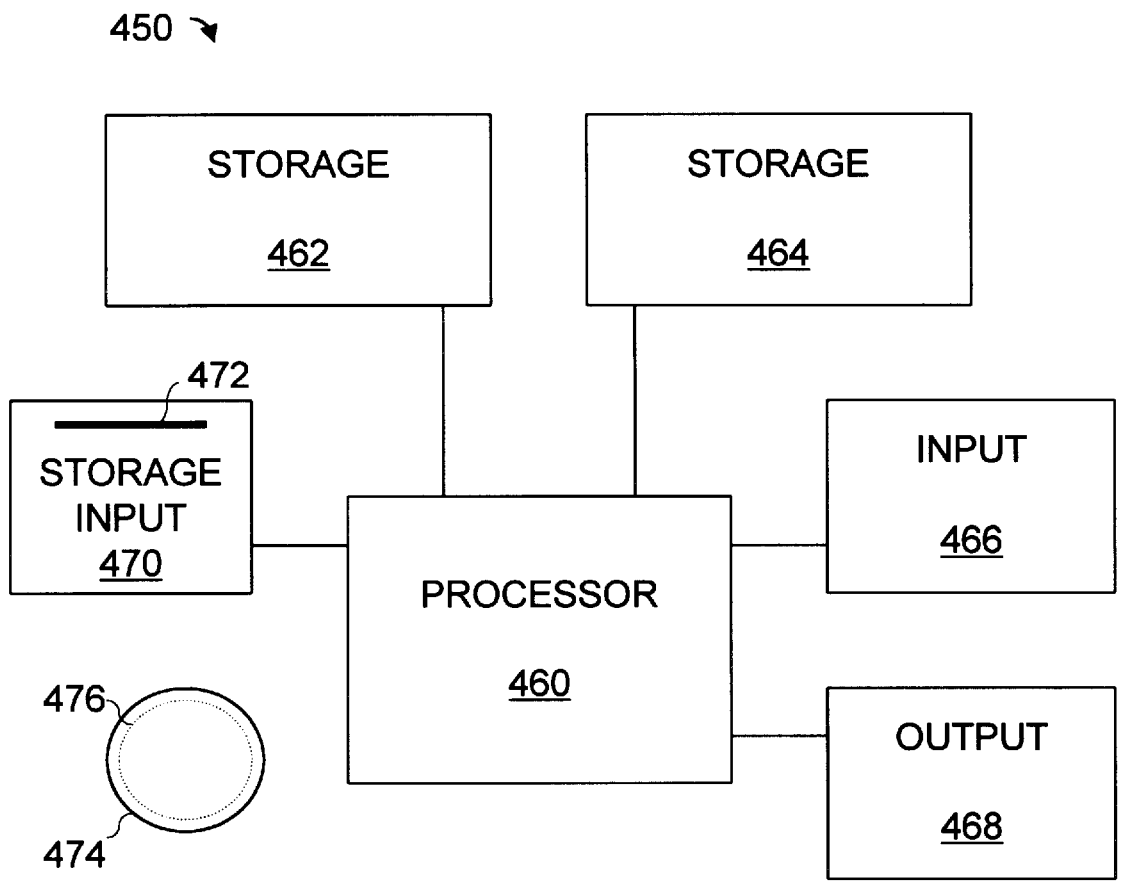
FIG. 4B is a block schematic diagram of a conventional computer system.

Referring now to FIG. 4B, a conventional computer system 450 for practicing the present invention is shown. Processor 460 retrieves and executes software instructions stored in storage 462 such as memory which may be Random Access Memory (RAM) and may control other components to perform the present invention. Storage 462 may be used to store program instructions or data or both. Storage 464, such as a computer disk drive or other non-volatile storage, may provide storage of data or program instructions. In one embodiment, storage 464 provides longer term storage of instructions and data, with storage 462 providing storage for data or instructions that may only be required for a shorter time than that of storage 464. Input device 466 such as a computer keyboard or mouse or both allows user input to the system 450. Output 468, such as a display or printer, allows the system to provide information such as instructions, data or other information to the user of the system 450. Storage input device 470 such as a conventional floppy disk drive or CD-ROM drive accepts via input 472 computer program products 474 such as a conventional floppy disk or CD-ROM that may be used to transport computer instructions or data to the system 450. Computer program product 474 has encoded thereon computer readable program code devices 476, such as magnetic charges in the case of a floppy disk or optical encodings in the case of a CD-ROM which are encoded as program instructions, data or both to configure the computer system 450 to operate as described below.

Figure 3:
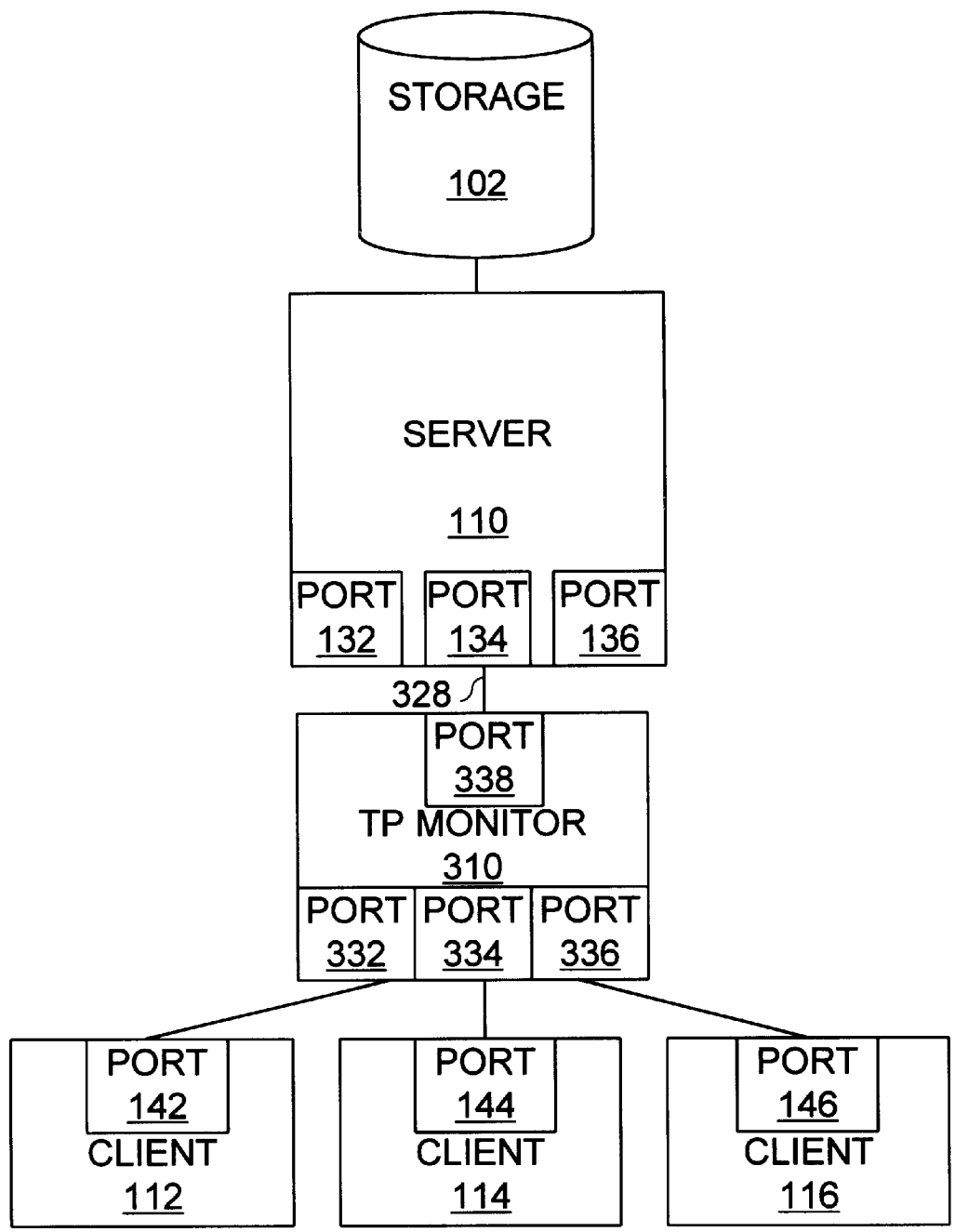
FIG. 3 is a block schematic diagram of four computers and a storage device coupled via a TP monitor in a conventional client-server architecture.

Referring now to FIGS. 4A and 4B, in one embodiment, each computer system 450 for the clients 112, 114, 116 and the resource manager 420 is a conventional IBM compatible computer running the Microsoft Windows 95 operating system, and the system 450 for the server 410 is a conventional Sun Microsystems Ultra 1 Creator computer running the Solaris 2.5.1 operating system commercially available from Sun Microsystems of Mountain View, Calif., although other systems may be used. In another embodiment, resource manager 450 may be implemented integrated into a conventional TP monitor such as the TP monitor 310 of FIG. 3.

Figure 5:
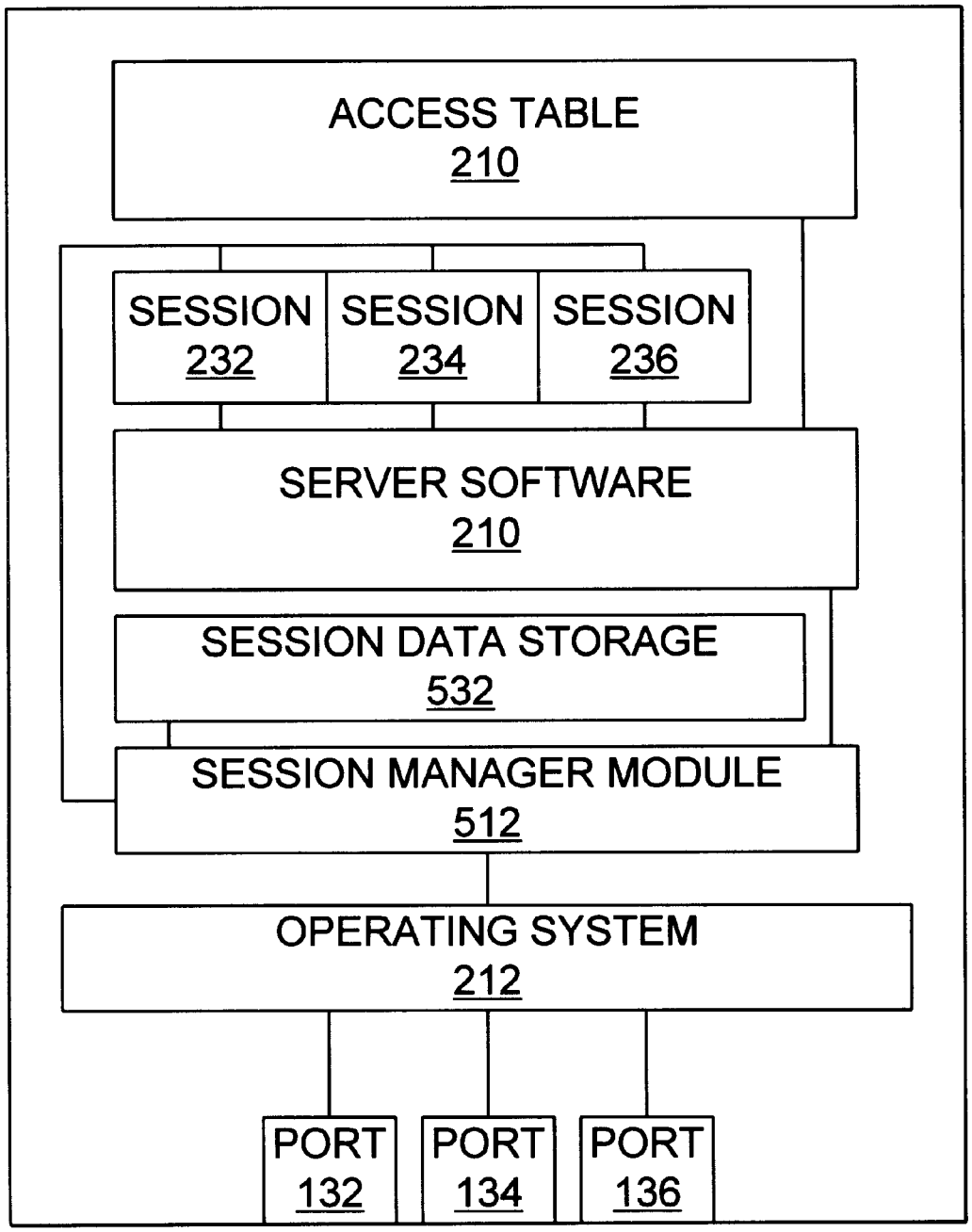
FIG. 5 is a block schematic diagram of a server according to one embodiment of the present invention.

Referring now to FIG. 5, a server 410 according to one embodiment of the present invention is shown. Like the server 110 of FIG. 1 of the prior art, server 410 contains server software 210 of FIG. 2 to manage the database and an access table 214 for security. In one embodiment, session data described above for the active session for each port 132, 134, 136 is stored in session data storage 232, 234, 236 corresponding to the users on ports 132, 134, 136. Session data storage 232, 234, 236 may be any storage device, such as a shared area of memory.

In one embodiment, the server software 210 operates as in the prior art, treating the active sessions defined by the data stored in session data storage 232, 234, 236 as if each session were bound to the corresponding port 132, 134, 136. However, session manager module 512 and session data storage 532 operate in the background to establish and maintain "inactive sessions," or sessions which it is desirable to maintain but for which commands can not be immediately accepted at a port. Session manager module 512 and session data storage 532 can change a session from inactive to active by transferring the session information or a pointer to the session information for the inactive session into session data storage 232, 234 or 236. When an server software command is received on the corresponding port 132, 134, 136, server software 210 will then use the new session information designated by session data storage 232, 234, 236 to process the command according to the new session information.

Figure 6:
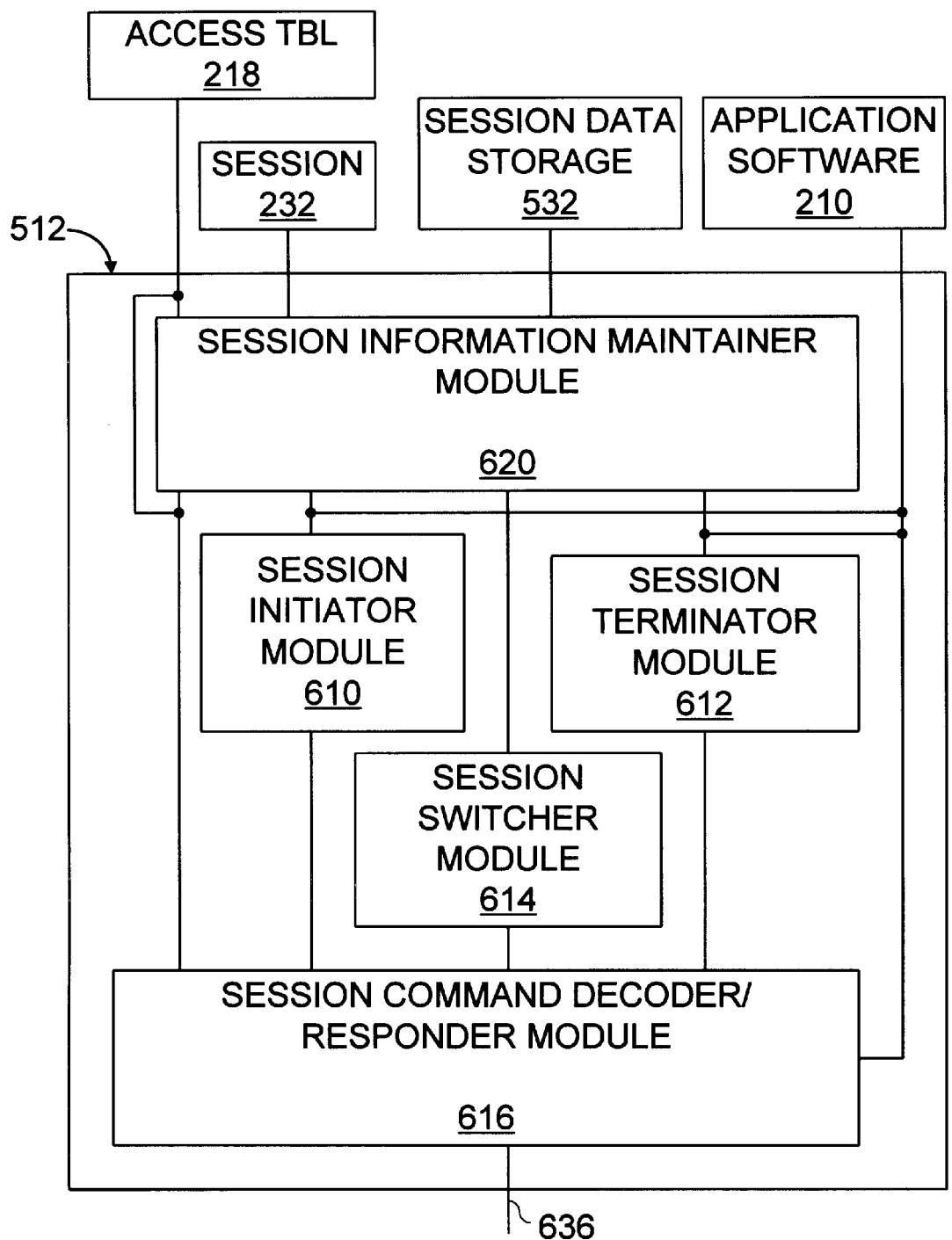
FIG. 6 is a block schematic diagram of a session manager module coupled to session data storage, server software, session data storage and an access table according to one embodiment of the present invention.

In one embodiment, session manager module 512 builds, maintains, switches and terminates session information in response to commands from external devices such as resource managers as described below. Referring now to FIG. 6, one embodiment of a session manager module 512 of FIG. 5 is shown.

Figure 2:
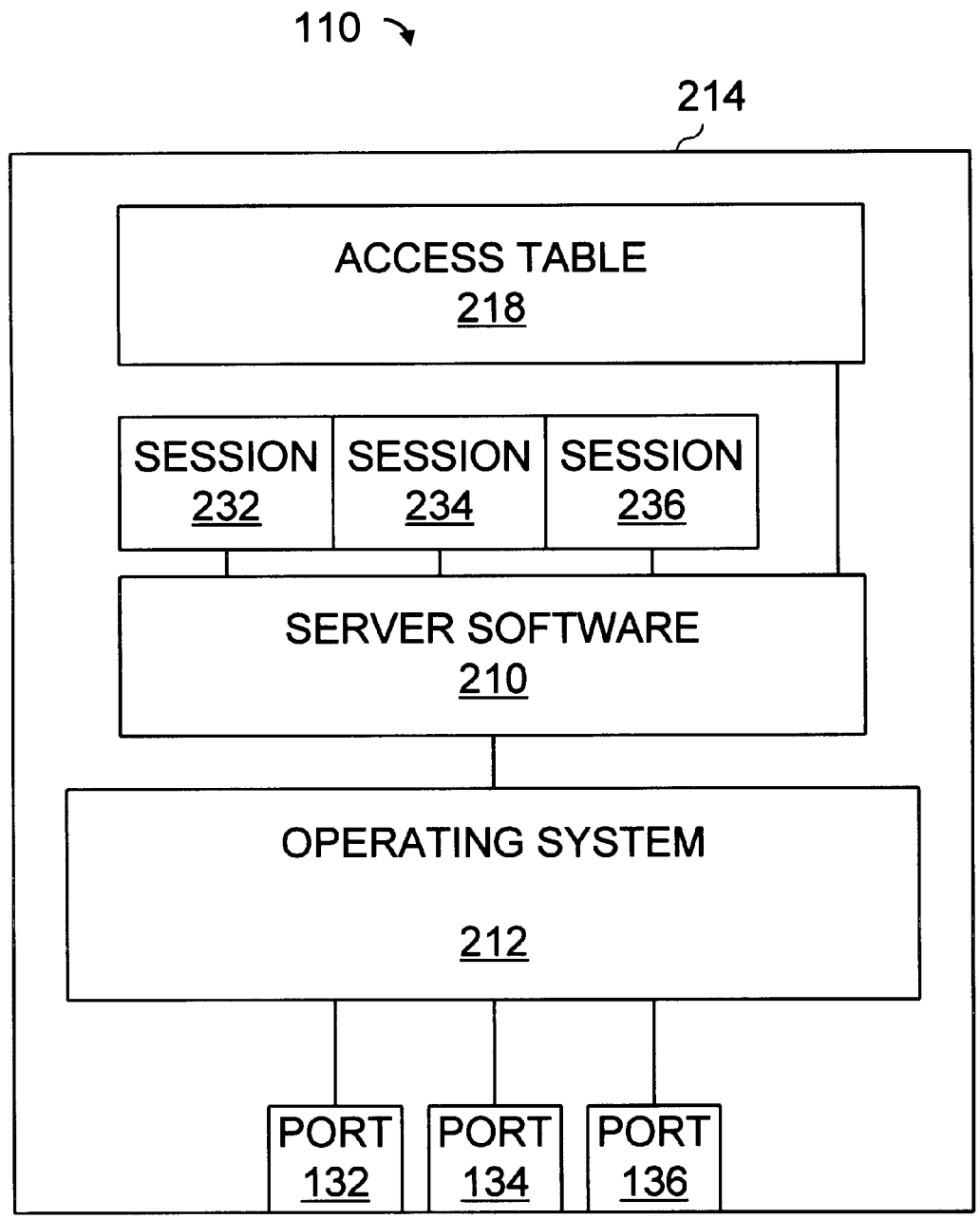
FIG. 2 is a block schematic diagram of a conventional server.

In one embodiment, a session manager module 512 manages one of the session data storage areas 232, 234 or 236 in FIG. 2 and is coupled to one of the ports 132, 134, 136 via input/output 636. (Session data storage 232 is illustrated as being managed by the session manager module 512, but the other session data storage areas 234 or 236 could have been selected. As described below, more than one session data storage 232, 234, 236 can be managed by a session manager module 512 in other embodiments.) The operating system 212 is directed to send all commands from the corresponding port 132, 134 or 136 to the input/output 636 of the session manager module 512.

Session command decoder/responder module 616 decodes commands received from the operating system 212 shown in FIG. 5. Session command decoder/responder module 616 identifies session commands that are used by the session manager module 512 and routes all other commands to the server software 210 for processing. Each command may contain a command code to identify the command and one or more parameters to be processed. Session command decoder/responder module 616 decodes the session command codes, and routes some or all of the command and/or parameters to session initiator module 610, session switcher module 614, session terminator module 612 or session information maintainer module 620 according to the command code decoded. Session command decoder/responder module 616 collects any responses generated by session initiator module 610, session terminator module 612, session switcher module 614, session information maintainer module 620 and server software 210 and returns them to the operating system 212 of FIG. 5 via input/output 636.

In one embodiment, the session command decoder/responder module 616 is not used, and the session initiator module 610, session terminator module 612, session switcher module 614, session information maintainer module 620 and server software 210 are coupled together to perform some or all of its functions.

In one embodiment, session information maintainer module 620 reserves space in session data storage 532 for the session data, initializes the storage and provides a handle to the memory reserved in response to a "OCIBeginSession" command received by session command decoder/responder module 616 and passed to session information maintainer module 620. The handle is passed via session command decoder/responder module 616 to the port which sent the OCIBeginSession command. The handle may be any identifier that uniquely identifies the space reserved, such as an address or an offset from a known address. As described below, the handle may be later used to refer to the session information stored in the session data storage 532. In another embodiment, the handle may be received by the session information manager as a part of the OCIBeginSession command, requiring the sender of the command to ensure that the handle is unique to those of other sessions managed by session manager module 512. Session data storage 532 and 232, 234, 236 of FIG. 2 may be any of the addressable storage devices 162, 164, 174 of the server system shown in FIG. 4B.

The session initiator module 610 is used to authenticate a user with the server 512 when a "OCIBeginSession" command is received by the session manager module 512. In one embodiment, an "OCIServerAttach" command must precede the OCIBeginSession command. The session initiator module 610 verifies that the user has access to the data in the server. To verify that the user has access to the database, in one embodiment, the session initiator module 610 uses the username and password received as a parameter to the OCIBeginSession command to query the access table 218 in the same manner that the server software 210 of FIG. 5 performs in the prior art when the user first logs on. If the access table 214 indicates that the user has access to the database, the session initiator module 610 directs the session information maintainer module 620 to copy the username or an identifier corresponding to the username into the area of session data storage 532 identified by the handle passed as a parameter with the OCIBeginSession command and to initialize certain other data. If the user does not have access to the data in the database, the session initiator module 610 returns an error message via session command decoder/responder module 616.

In one embodiment, the command received by the session initiator module 610 that causes the session to be initiated contain a parameter indicating the session is "switchable" or "migratable" and session initiator module 610 marks the session as a switchable session. In one embodiment, sessions not so marked may not be switched as described below, and an attempt to switch a session not marked as switchable or to initiate a session over the same port as a session not marked as switchable causes the server to return an error message.

In one embodiment, the OCIBeginSession command, OCIServerAttach command and OCIBeginSession are combined into a single OCILogon command, which causes the session manager module 512 to perform the actions for both commands described above.

Referring now to FIGS. 2 and 6, in one embodiment, upon receipt of a OCILogon command or a OCIBeginSession command, session initiator module 610 directs the server software 210 to log the user on using the server software's conventional log on commands, and watches for a valid response from the server software 210. If a valid response is returned, session initiator module 610 copies to the session data storage 532 the session information from the session data storage 232 provided by the server software 210. The handle used for the copy is received as a parameter to the OCIBeginSession command in one embodiment, or provided to the device sending the OCILogon or OCIBeginSession command in another embodiment.

Referring now to FIGS. 2, 4, 5 and 6, when a client 112, 114, 116 wishes to perform work, if the session information corresponding to the client is not in session data storage 232, 234 or 236 associated with a port, it must be switched into session data storage 232, 234 or 236 corresponding to the port over which the user will send the subsequent commands to be recognized by the server software 210 which will execute the commands used to perform the work desired. Session switcher module 614 switches session data into the proper session storage 232 upon receipt by session command decoder/responder module 616 of a command containing as a parameter the handle of the session information stored in session data storage 532. Session command decoder/responder module 616 passes the handle received to session switcher module 614, which directs session information maintainer module 620 to copy the session information stored at the location in the session data storage 532 identified by the handle into the session data storage 232 coupled to the session manager module 512.

In one embodiment, the session information that was formerly in the session data storage is deleted and replaced by the session data corresponding to the handle received. In another embodiment, session switcher module 614 first directs the session information maintainer module 620 to copy the session data stored in session data storage 232 back into session data storage 532 before executing any command that causes a session to be switched so that the status information in session data storage 232 at the time the command that switches the session is received is preserved for the next time a command is executed in accordance with that session.

In another embodiment, the information in the session data storage 232 is a pointer to the session data stored in session data storage 532. In such embodiment, it is not necessary to copy the session data between session data storage 532 and session data storage 232 as described above. The pointer stored in session data storage 232 is adjusted by session information maintainer module 620 to point to the session data stored in session data storage 532 to designate a session as the active session, and the session data corresponding to the session active before any change in the active session designation is preserved in session data storage 532.

When a subsequent command is received by the server software 210 over the port associated with session data storage 232, the server software 210 will use the new session data designated by the session data storage 232 for processing the command according to the security access and the status of the session data copied into session data storage 232. If the handle received does not correspond to a handle that is associated with a session, session switcher module 614 returns an error message via session command decoder/responder module 616 to the port originating the command.

In one embodiment, an active session must be released by its owner before the active session is switched to a new session. In such embodiment, a "release session" command is received by session command decoder/responder module 616 and routed to session information maintainer module 620 to designate that the active session may be switched. In such embodiment, the session corresponding to the port over which the command is received is flagged by session information maintainer module 620 as available for switching. In one embodiment, the handle of the session is passed as a parameter to the command, and the handle is used by session information maintainer module 620 to identify the session available for switching. In another embodiment, no such release session command is necessary: sessions are switched when a command containing a session handle is received. In another embodiment, all migratable sessions are released after the command containing the session handle is processed, so even a subsequent command sent from the same client over the same port requires the session handle to be transmitted in the subsequent command.

In another embodiment, all sessions are released after any command received following a command to switch the session is processed by the server software 210. In such embodiment, the session must be switched by the sender of any command prior to sending any subsequent command. Even two sequentially sent commands must be preceded with a request to switch the session because there is no guarantee that the session which processed the first command is still active at the time the second command is received. Such an embodiment is used to avoid requiring the session manager 512 from having to process a separate command to release the active session for switching.

The session terminator module 612 allows sessions to be removed from the session data storage 532. In one embodiment, sessions may be terminated using an "OCISessionEnd" command to terminate a single session, or an "OCIServerDetach" command to terminate all sessions that were initiated from a particular port. Such a command to terminate all sessions may be useful when the resource manager 420 is being shut down. In one embodiment, an all server detach command is inferred if the physical connection between the server 410 and the resource manager 420 is terminated. If a OCISessionEnd command is received with a session handle, session command decoder 616 passes the handle to session terminator module 612 which instructs session information maintainer module 620 to remove the associated session information from session data storage 532. If a session handle is not received as a parameter, or if an indication is received that the physical connection has been terminated, e.g. a notice passed to session command decoder/responder module 616 from the operating system that the data set ready signal of the port is dropped, session terminator module 612 instructs session information maintainer module 620 to terminate all sessions that were originated using that port and the originating information is stored in session data storage 532 by session initiator module 610 via session information maintainer module 620. All active sessions corresponding to sessions terminated are marked as available for switching by session terminator module 612 as if a release session command had been received.

In one embodiment, session terminator module 612 instructs session information maintainer module 620 to make memory associated with the handle associated with the terminated session as well as the handle itself available for reuse. In another embodiment, session information maintainer module 620 will accept an "OCIHandleFree" command to perform this same function.

In one embodiment, it isn't necessary to instruct the server software 210 that the user has terminated the session. In another embodiment, session terminator module 612 instructs session information maintainer module 620 to copy null session information into the session data structure 232 managed as described above by the session manager module 512 if the terminated session is active.

In one embodiment, session information maintainer module 620 maintains a list of available session handles. When a session is initiated, the handle for the session initiated is provided from the list and removed from it. When a session is terminated, the handle is returned to the list. In another embodiment, the session handle is received with the OCIBeginSession command, and the session manager module 512 uses this identifier provided by the resource manager as described below.

In one embodiment, session manager module 512 controls multiple ports of the server, and is coupled to all session data storage areas 232, 234, 236. The operating system passes the port number from which any command was received, and the port number is passed by session command decoder/responder module 616 to session initiator module 610, session terminator module 612, session switcher module 614 or server software 532, which will then perform the above actions using the proper session data storage 232, 234 or 236 corresponding to the port from which the command was received.

Referring now to FIGS. 2, 5 and 6, where it is possible to reprogram the server software 210, an alternative approach to the session manager module 512 described above may be employed which integrates the functions and elements of the session manager module 512 described above into the server software 210. In this embodiment, the server architecture of FIG. 2 is employed, with modified server software that performs the functions described herein.

Because the session manager module 512 can run independent of the conventional server processes, session manager 512 can switch a session among processes. For certain applications, it may not be desirable to allow a session to be switched to a process different than the process on which the session was established. In one embodiment, the command establishing the session includes a designation that the session may only be switched back to its originating process. Session initiator module 610 directs session information maintainer module 620 to mark in session data storage 532 the session with an identifier of the process on which it was initiated. In one embodiment, this is accomplished by identifying the session data storage 232 in which it was established. Session information maintainer module 620 will only switch the session to the process marked, waiting if necessary for the session data storage 232 to become available.

Referring momentarily to FIGS. 4A and 5, the resource manager 420 couples the clients 112, 114, 116 to the server 410. In one embodiment, the clients 112, 114, 116 are not aware of the presence of the resource manager 420. Each client 112, 114, 116 acts as if it is directly coupled to the server 410 similar to the arrangement shown in FIG. 1. The resource manager 420 and the session manager module 512, or session manager module functions integrated with the server software 210, handle swapping the session information transparently to the clients 112, 114, 116. To perform this function, the resource manager 420 maintains a list of the handles associated with the client ports 432, 434, 436 to which the handle relates and maintains which of the handles correspond to an active session so that if a command is received by resource manager 420 on a client port 432, 434, 436 that is not associated with an active session, the resource manager 420 may direct the server 410 to switch the session corresponding to the client port 432, 434, 436 prior to sending the command.

Figure 7:
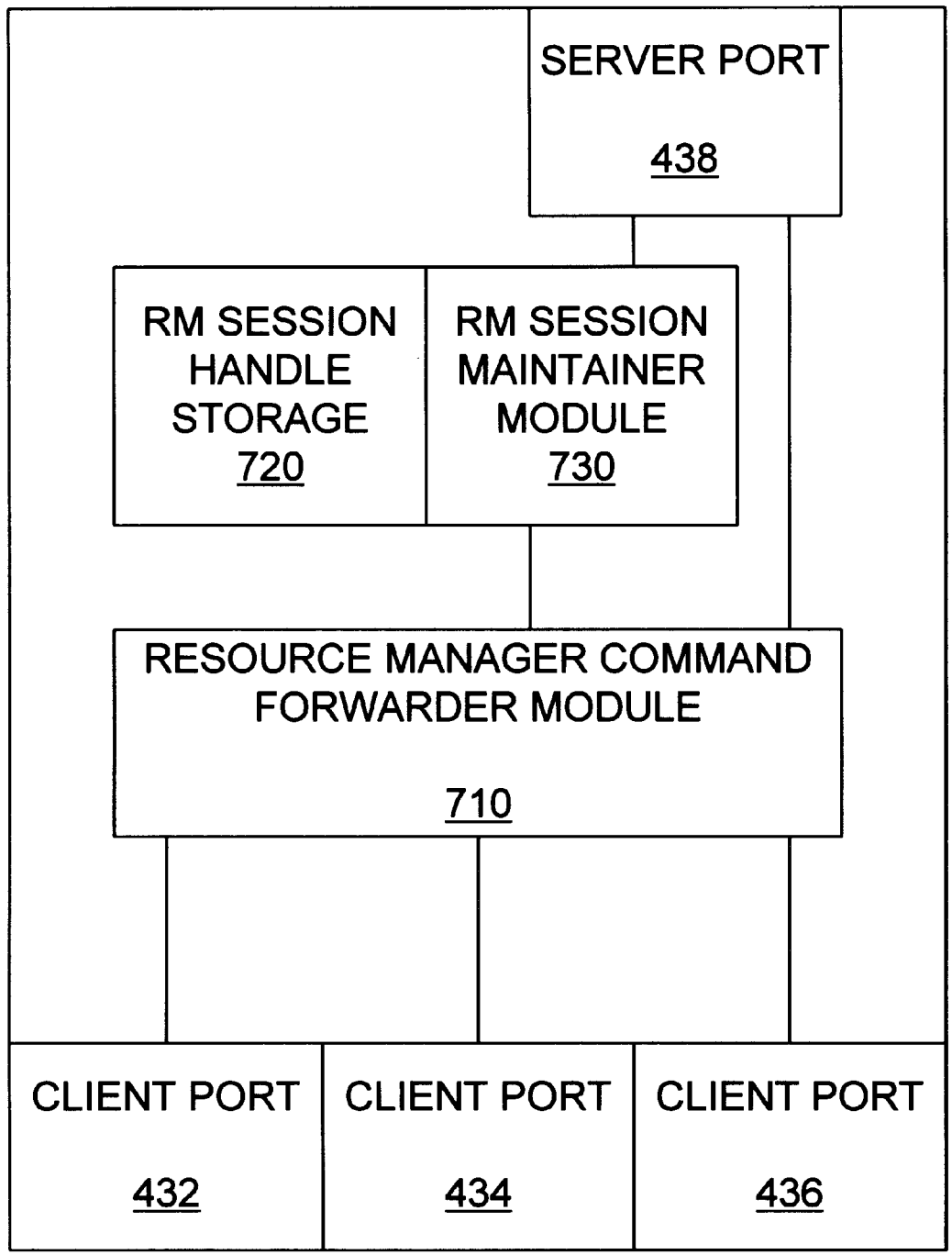
FIG. 7 is a block schematic diagram of a resource manager with a single server port for connection to a single server according to one embodiment of the present invention.

Referring now to FIG. 7, the resource manager 420 of FIG. 4A according to one embodiment of the present invention is shown. Client ports 432, 434, 436 are each coupled to receive commands from a client 112, 114, 116 as shown in FIG. 4A. Resource manager command forwarder module 710 receives commands from each of the client ports 432, 434, 436, stores the command and determines how to forward the command to the server port 438 coupled to a port 132, 134, 136 of the server 410 as shown in FIG. 4.

The determination of how to forward a command from a is made by the resource manager session maintainer module 730 based upon the command received by the resource manager command forwarder module 710. If the command received is a OCILogon command, the session is established and maintained by the resource manager session maintainer module 730. In one embodiment, a OCIBeginSession command is fashioned by the resource manager session maintainer module 730 and sent to server port 438. If the confirmation is received that the OCILogon or OCIBeginSession command was successful, the handle is received via server port 438 by resource manager session maintainer module 730 and stored in resource manager session handle storage 720 associated with an identifier of the client port 432, 434, 436 from which the OCILogon command was received. The OCIBeginSession command is generated by resource manager session maintainer module 730 using the information regarding the user identifier and password received by the resource manager command forwarder module 710. This information is transmitted by the resource manager session maintainer module 730 to the server port 438.

In one embodiment, the handle is provided to the server port 438 by the resource manager as a part of the OCIBeginSession command. Resource manager session maintainer module 730 selects a handle from a list stored in resource manager session handle storage 720, marks the handle as being in use, and provides the handle as a part of the OCIBeginSession command described above.

In one embodiment, a portion of any confirmation to the OCIBeginSession command is forwarded back to the client port 432, 434 or 436 from which the command originally came so as to inform the client coupled to the client port 432, 434, 436 that the OCILogon was successful. Resource manager session maintainer module 730 removes any acknowledgment data that is not to be forwarded to the client port 432, 434, 436 and forwards via resource manager command forwarder module 710 the remainder of the command to the port 432, 434 or 436 from which the command was received. To identify the client port 432, 434 or 436 from which the command was received, resource manager command forwarder module 710 will not send a command received from other client ports 432, 434, 436 until the acknowledgment for the last command sent is returned via port 438. Subsequent commands received from a port 432, 434, 436 are queued by resource manager command forwarder module 710 until the acknowledgment from any commands sent to server port 438 are received. An identifier of the client port 432, 434 or 436 corresponding to the command for which an acknowledgment is expected is stored by resource manager command forwarder module 710 to allow it to match up the acknowledgment. Resource manager command forwarder module 710 sets a timer at the time it forwards a command for which is expects an acknowledgment, and clears the timer when the acknowledgment is received. If the timer expires before the acknowledgment is received, resource manager command forwarder module 710 sends a timeout message to the client port 432, 434 or 436 from which the command was received in one embodiment. In another embodiment, the last command sent is stored by resource manager command forwarder module 710 so that it may be resent a certain number of times before sending the timeout message to port 432, 434 or 436.

If the command received by resource manager command forwarder module 710 is a command by the user to log off of the server, or if the physical connection to the client is terminated, resource manager session maintainer module 730 looks up in the resource manager session handle storage 720 the handle corresponding to the client port 432, 434 or 436 from which the command was received, and uses the handle to fashion a OCISessionEnd command which is forwarded to the server port 438. In one embodiment an OCIServerDetach command is also fashioned and sent to server port 438 with the handle identifier of the session terminated to instruct the server to terminate the server process. In one embodiment, the session is first switched or marked as available to be switched if necessary using a release session command prior to sending the command as described below if the command is received from a port corresponding to a session that is currently active. When an acknowledgment is received on port 438 that the session has ended, the session handle is removed from the resource manager session handle storage 720 upon instruction from resource manager session maintainer module 730 which receives notice of the acknowledgment by resource manager by monitoring a direct connection to the port 438 in one embodiment, or by a signal from the resource manager command forwarder module 710 in another embodiment. Resource manager command forwarder module 710 monitors the time between the command and the acknowledgment as described above, and resends the command or sends a timeout message to the initiating port 432, 434, 436, the identity of which is maintained as described above.

When other types of commands such as queries are received from ports 432, 434, 436, resource manager command forwarder module 710 stores the command and notifies resource manager session maintainer module 730 the client port 432, 434 or 436 on which the command has been received. Resource manager session maintainer module 730 identifies whether the client port 432, 434 or 436 corresponds to the session currently active, and if so, notifies resource manager command forwarder module 710 to forward the command to port 438. In one embodiment, if the command is received from a client port 432, 434 or 436 that does not correspond to the currently active session, the session is switched as described below. In another embodiment, the session is always switched when a command is received.

In one embodiment, resource manager session maintainer module 730 maintains the currently active session, which is either the session most recently logged on or the session most recently switched in one embodiment. In one embodiment, this identification is made when a session is made active by the resource manager by storing the session handles in resource manager session handle storage 720 in a way that the currently active session is implicitly identified, such as being in the head of a linked list in one embodiment, or having a flag set in another embodiment. The session handle is stored in resource manager session handle storage 720 along with a unique identifier corresponding to the client port 432, 434 or 436 from which the command was received so that subsequent commands from that client port 432, 434 or 436 can be associated with the proper session.

The session is switched by resource manager session maintainer module 730 identifying in the resource manager session handle storage 720 the handle corresponding to the port 432, 434, 436 from which the command was received, and using the handle to generate and send the command including the session handle via server port 438. Resource manager session maintainer module 730 then instructs resource manager command forwarder module 710 to forward the command received to port 438 or generates and sends to port 438 a new command based on the command received or directs resource manager command forwarder module 710 to modify the command as described above. In this fashion, the resource manager 420 instructs the server to switch the session, and then the resource manager 420 sends to the server a command such as a query corresponding to the command received from the client port 432, 434 or 436.

In one embodiment, when the session is switched, resource manager session maintainer module 730 updates its identification of the currently active session described above. In another embodiment, the currently active session is not maintained by the resource manager session maintainer module 730, and a OCIBeginSession command is sent prior to any command received by resource manager command forwarder module 710, even if the command it receives is from the client corresponding to an active session.

In one embodiment, resource manager session maintainer module 730 fashions and sends via server port 438 a release session command following the forwarding of the server command if necessary as described above. In one embodiment, if additional commands have been received and queued by resource manager command forwarder module 710 from the same client port 432, 434 or 436 that is presently active, such command is moved to the front of the queue in the resource manager command forwarder module 710 and forwarded to server port 438 and this process repeats until a command from a port 432, 434 or 436 not corresponding to the active session is queued by resource manager command forwarder module 710 without any commands from the port 432, 434 or 436 corresponding to the active session, at which point resource manager session maintainer module 730 generates and sends the release session command if necessary, and services the next command in the queue as described above.

Figure 8:
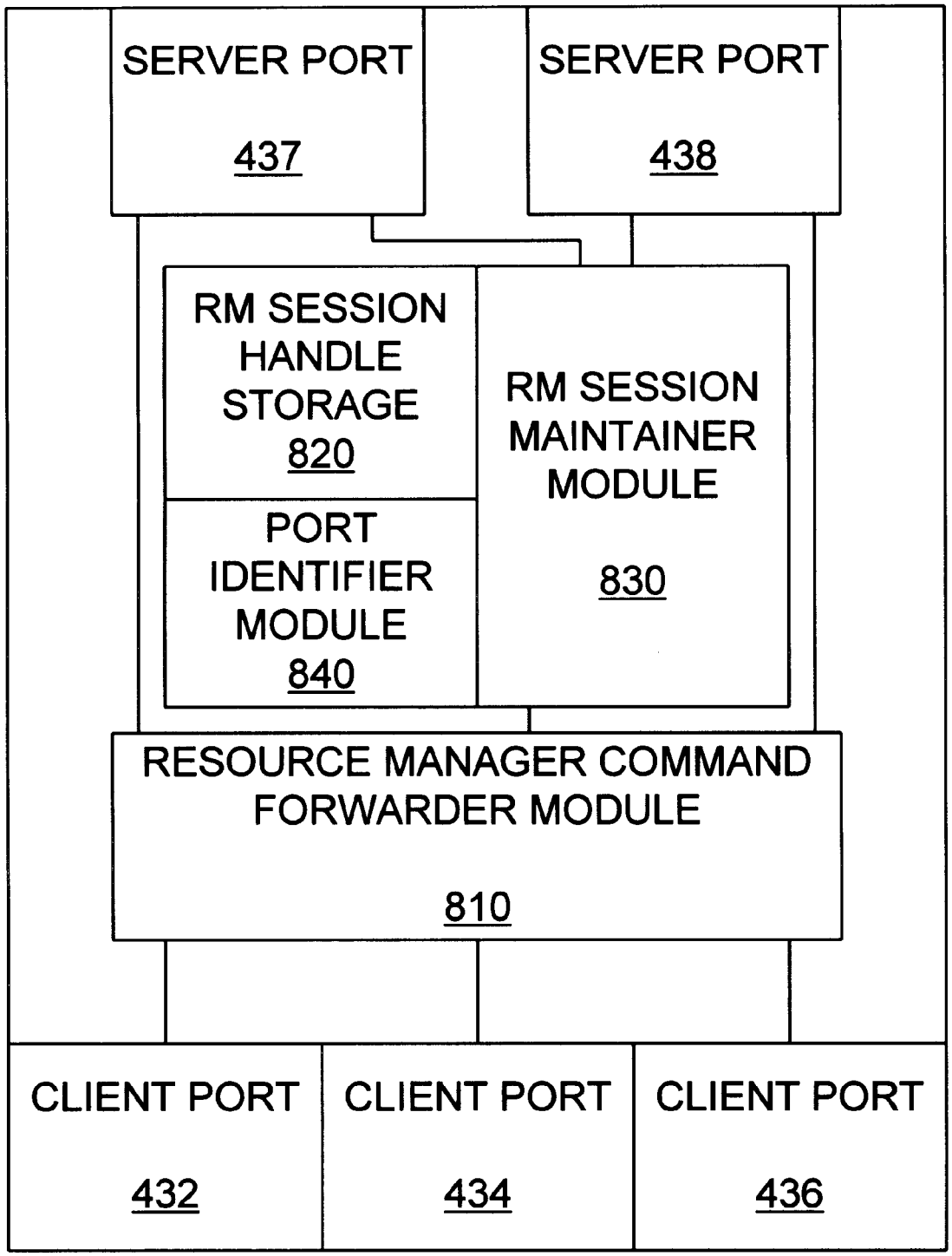
FIG. 8 is a block schematic diagram of a resource manager with multiple server ports for connection to a single server according to one embodiment of the present invention.

A resource manager can be connected to a server by more than one port as illustrated in FIG. 4A. Referring now to FIG. 8, a resource manager having multiple server ports 437, 438 according to one embodiment of the present invention is shown. Resource manager command forwarder module 810, resource manager session handle storage 820 and resource manager session maintainer module 830 operate similarly to resource manager command forwarder module 710, resource manager session handle storage 720 and resource manager session maintainer module 730 of FIG. 7 and described above except as noted below.

Resource manager session maintainer module 830 maintains in resource manager session handle storage 820 a single group of handles used for both ports 437, 438 and two identifiers corresponding to each of the active sessions on ports 437 and 438, and also maintains which server port 437, 438 was used to send the most recent communication for each of the two active sessions. Resource manager session maintainer module 830 maintains these identifiers so that the most recently used active session handle is distinguishable from the second most recently used active session handle, such as keeping the most recently used active session handle as the first entry in a linked list, and the second most recently used active session handle as the second entry in a linked list. When a command is received by resource manager command forwarder module 810, it queues the command and notifies resource manager session maintainer module 830 the identifier of the client port 432, 434 or 436 from which the command was received. Resource manager session maintainer module 830 requests from port identifier module 840 an identifier corresponding to one of server ports 437 or 438. Port identifier module 840 checks resource manager session handle storage 820 to identify if the handle corresponding to the session of the client port 432, 434, 436 is currently active, and if so, port identifier module 840 identifies the server port 437, 438 last used for that session to resource manager session maintainer module 830. The command communications described above are performed using the same server port 437, 438 that was last used for communications from client port 432, 434, 436. If the handle corresponding to port 432, 434, 436 was the second recently used active session handle, the corresponding identifier is adjusted by resource manager session maintainer module 830 in resource manager session handle storage 820 to show that it is the most recently use active session handle.

If the handle corresponding to the port 432, 434, 436 is not one of the two active session handles, resource manager port identifier module 840 must select one of the ports 437, 438 to identify to resource manager session maintainer module 830 to use and switch the session on that port as described above, before sending the communication or communications generated by the command received from client port 432, 434 or 436 as described above. It may be desirable to try to predict which of the two active handles will be used next, so as to maintain its active status. It may be desirable not to switch the handle so predicted to be used next so as to reduce the overhead associated with switching handles. In one embodiment, port identifier module 840 identifies to resource manager session maintainer module 830 the port 437, 438 corresponding to the second most recently used active session handle, on the theory that the most recently used active handle is most likely to be needed next, and therefore it should remain active. In another embodiment, port identifier module 840 identifies to resource manager session maintainer module 830 the first most recently used active session handle, on the theory that the frequency of use of the two active session handles is about equal, and therefore the second most recently used active session handle is the most likely of the active session handles to be used next. Resource manager session maintainer module 830 uses the port identified by port identifier module 840 to send the command received from the client port 432, 434 or 436, as well as any commands switching the session if necessary as described above.

Resource manager session maintainer module 830 instructs resource manager command forwarder module 810 over which port 437, 438 to send the command or modified command, and the resource manager command forwarder module 810 uses that port 437 or 438 to send the command, and to receive any acknowledgments as described above. Resource manager session maintainer module 830 sends any commands corresponding to the command received by resource manager command forwarder module 810 to this same port 437 or 438 as described above, for example, a release session command if necessary and a command containing the session handle described above.

Resource manager command forwarder module 810 can send commands via either of the two server ports 437, 438 and acknowledgments received from server ports 437, 438 are sent back to the client port 432, 434 or 436 corresponding to the client port 432, 434 or 436 from which the command was received. In one embodiment, this is accomplished by the resource manager command forwarder module 810 maintaining a list of correspondence between server ports 437, 438 and client ports 432, 434, 436 and directing the resource manager command forwarder module 810 to send acknowledgments received on the corresponding server port 437 or 438 to the corresponding client port 432, 434 or 436.

Figure 9:
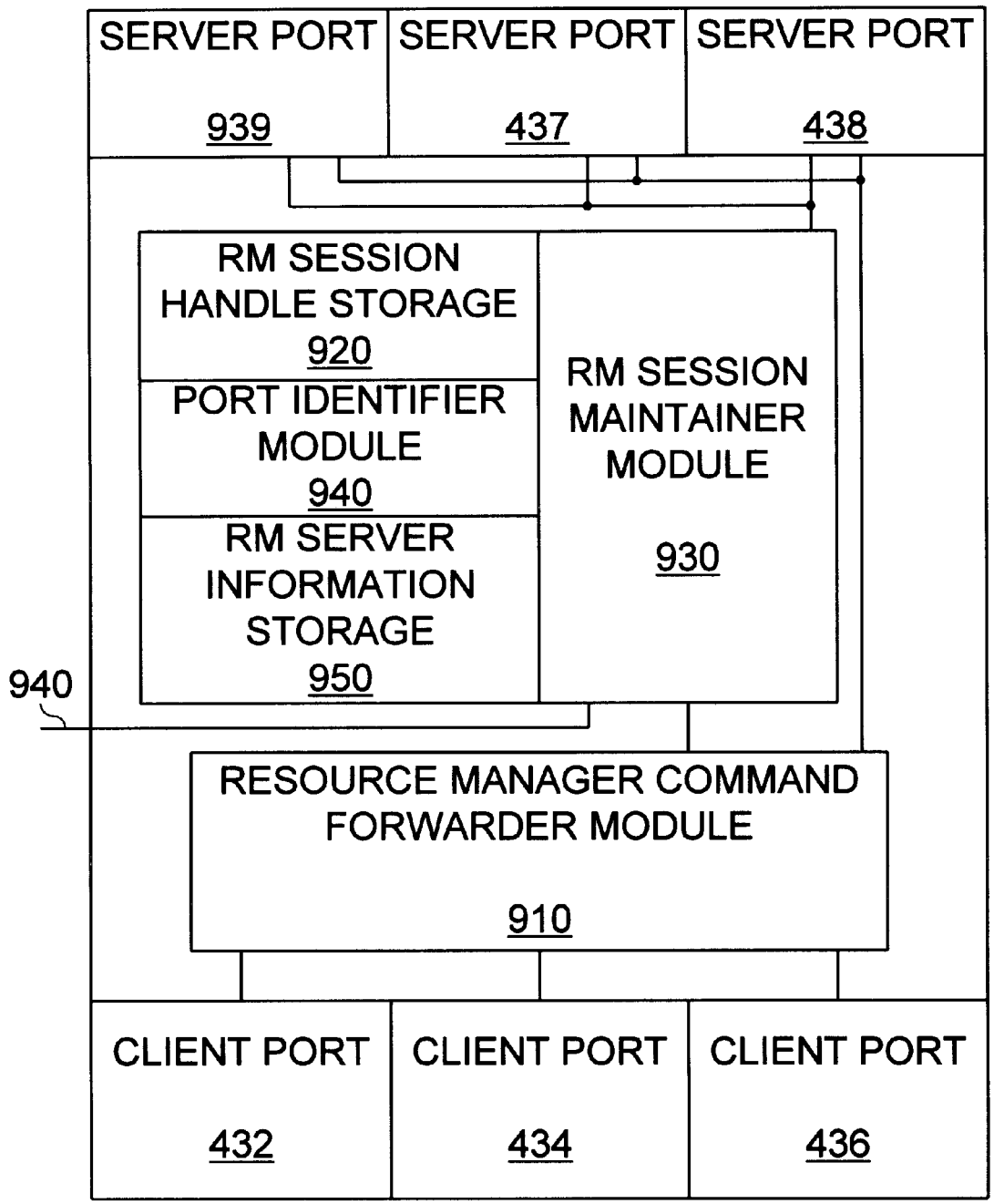
FIG. 9 is a block schematic diagram of a resource manager with multiple server ports for connection to multiple servers according to one embodiment of the present invention.

In one embodiment, the resource manager may be coupled to multiple servers. Each server is coupled to the resource manager using a pool of one or more ports on the resource manager. Referring now to FIG. 9, a resource manager that may be coupled to more than one server according to one embodiment of the present invention is shown. Ports 437, 438, 432, 434, 436 are coupled to clients and servers as described above with reference to FIG. 8. Server port 939 is coupled to a server different from that coupled to ports 437, 438. Resource manager command forwarder module 910, resource manager session maintainer module 930, port identifier module 940 and resource manager session handle storage 920 operate similarly to the resource manager command forwarder module 810, resource manager session maintainer module 830, port identifier module 840 and resource manager session handle storage 820 of FIG. 8, except that each command generated or forwarded must be routed to the port 437, 438, 939 coupled to the proper server as described below.

In one embodiment, the clients coupled to each of the client ports 432, 434, 436 can select which server they will access at the time they login. Each server port 437, 438, 939 is associated with a specific server using setup input 940 or one of the client ports 432, 434 or 436 to provide a server identifier and an identifier of the port 437, 438, 939 to be associated, and this information is stored by resource manager session maintainer module 930 in resource manager server information storage 950. When a connection is initially established with a client on client ports 432, 434 or 436, the list of available clients is provided to the client port 432, 434 or 436 by the resource manager session maintainer module 930 for presentation to the user via resource manager command forwarder module 910. The login command received via client port 432, 434 or 436 includes an identifier designating the server to which the client desires to log in. Using the information stored in resource manager server information storage 950, port identifier module 940 identifies to resource manager session maintainer module 930 an available server port 437, 438, 939 corresponding to the server desired by the client. If more than one server ports 437, 438 are coupled to the server desired by the client, port identifier module 940 selects from among multiple ports 437, 438 coupled to a single client as described above. Resource manager session maintainer module 930 sends, or directs resource manager command forwarder module 910 to send, the appropriate command to such port 437, 438, 939 as described above. Resource manager session maintainer module 930 associates the session handle with an identifier of the server to which the session handle is received via port 437, 438, 939 and stores the handle and the server identifier in resource manager session handle storage 920. Port identifier module 940 can instruct resource manager session maintainer module 930 to send subsequent commands to the server port 437, 438, 939 associated with the server associated with the session to which the command relates if the session is active, or to a server port 437, 438 or 939 coupled to the server last used as described above if the session is not active.

In one embodiment, the server ports 437, 438, 939 are dynamically allocated among available servers by port identifier module 940 based upon the number of active sessions with the servers and/or commands queued by resource manager command forwarder module 910.

In one embodiment, a user may be logged onto several servers simultaneously using the same client port 432, 434, 436, and therefore a client port may be simultaneously associated with multiple sessions, each on a different server or on the same server. In such embodiment, a "new session" command may be received via client port 432, 434, 436 to establish a new session as described above, and the session handle or other identifier which may be stored in the resource manager session handle storage 920 associated with the session handle is passed by resource manager session maintainer module 930 via resource manager command forwarder module 910 to the client via client port 432, 434, 436. The client can send to port 432, 434, 436 the identifier prior to or with each subsequent command, which is used by port identifier module 940 to identify the proper server port 437, 438, 939 over which to send the necessary commands as described above. In another embodiment, all client commands received from a client port 432, 434, 436 are assumed by resource manager session maintainer module 930 to be directed to the same server until a "change server" command is received from that client port 432, 434, 436.

The present invention includes methods for requesting a server session, methods for initializing a server session, methods for processing server commands from multiple clients, and methods for forwarding server commands from multiple clients.

Figure 10:
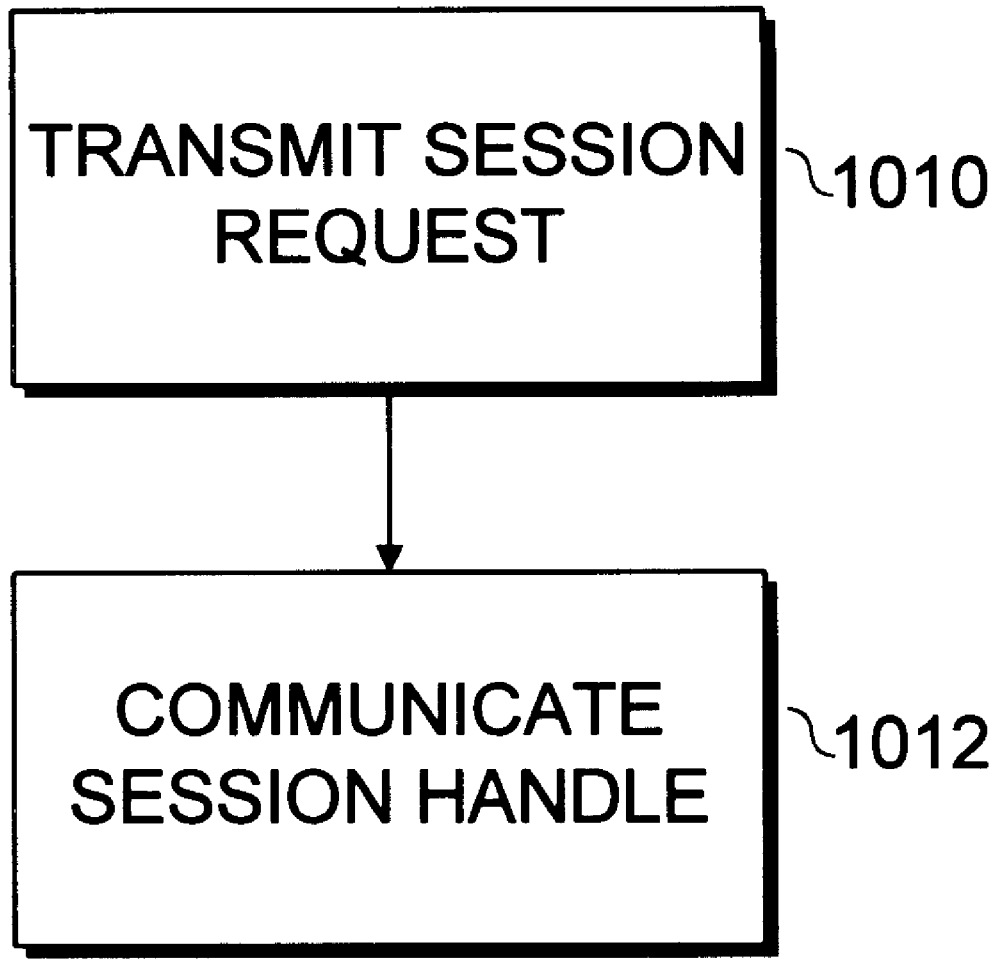
FIG. 10 is a flowchart illustrating a method of requesting the establishment of a server session according to one embodiment of the present invention.

Referring now to FIG. 10, a method of requesting a server session according to one embodiment of the present invention is shown. A session request is transmitted 1010. The session request transmitted is a single command in one embodiment, containing a user identifier and password. In another embodiment, two commands are used to make the request: a request for a handle, and a request to authenticate and provide access to a user, where the request contains a user identifier and a password. In one embodiment, the OCILogon command may be used as described above. In one embodiment, a multiple command process is used to initialize the process and allocate all handles associated with the session. OCIEnvInit is called to initialize the application, and then OCIBeginSession and one or more type parameters are used to allocate the handles. OCIServerAttach and OCIBeginSession are then used to create the server process and then authenticate the user.

A session handle is then communicated 1012. In one embodiment, the handle is selected and provided. In one embodiment, the handle is received. The handle may be used as described below to refer to a session.

Figure 11:
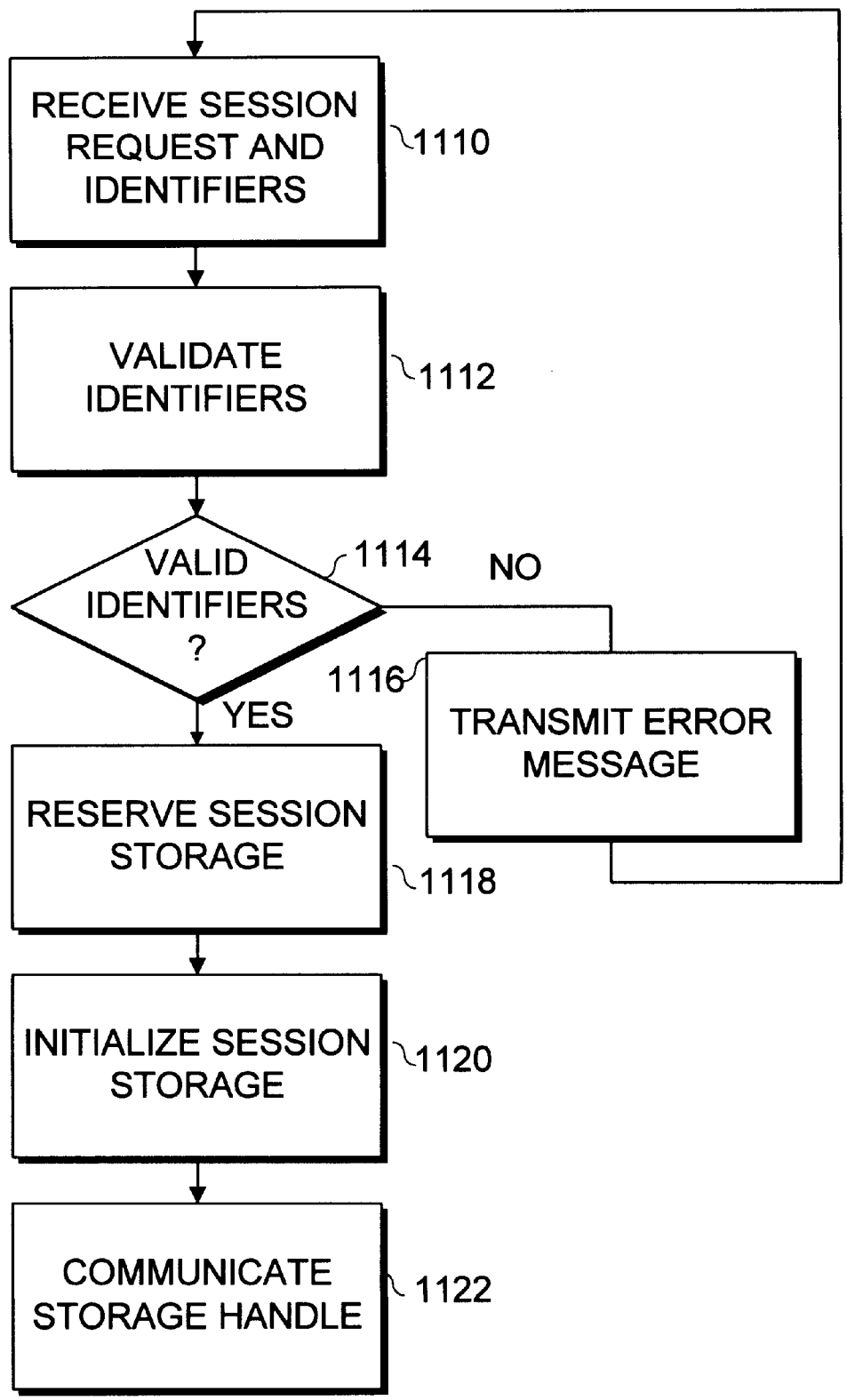
FIG. 11 is a flowchart illustrating a method of establishing a server session according to one embodiment of the present invention.

Referring now to FIG. 11, a method of initializing a session is shown. A session request is received 1110. In one embodiment, the session request is received as a single command with a user identifier and password or other identifiers of the user requesting the session. In another embodiment, the session request is received in two parts: a request to identify a handle, and a request to allow access to a user with a user identifier and password as described above. In one embodiment, no password is necessary. In another embodiment, the multiple commands described above are received as a session request. The identifiers related to access are checked against a list of valid identifiers 1112. If the identifiers are not valid, an error message is transmitted 1116 and the process may terminate or repeat at step 1110. If the identifiers are valid, storage is reserved for session data 1118. The session storage reserved may be optionally initialized 1120. A handle identifying the storage area reserved is communicated to or from the device which sent the original request 1122. In one embodiment, this communication is made over the same logical data path as the session request received. In one embodiment, there may be more handles than ports as described above. In one embodiment, step 1122 is performed at any time during or after step 1110.

Figure 12:
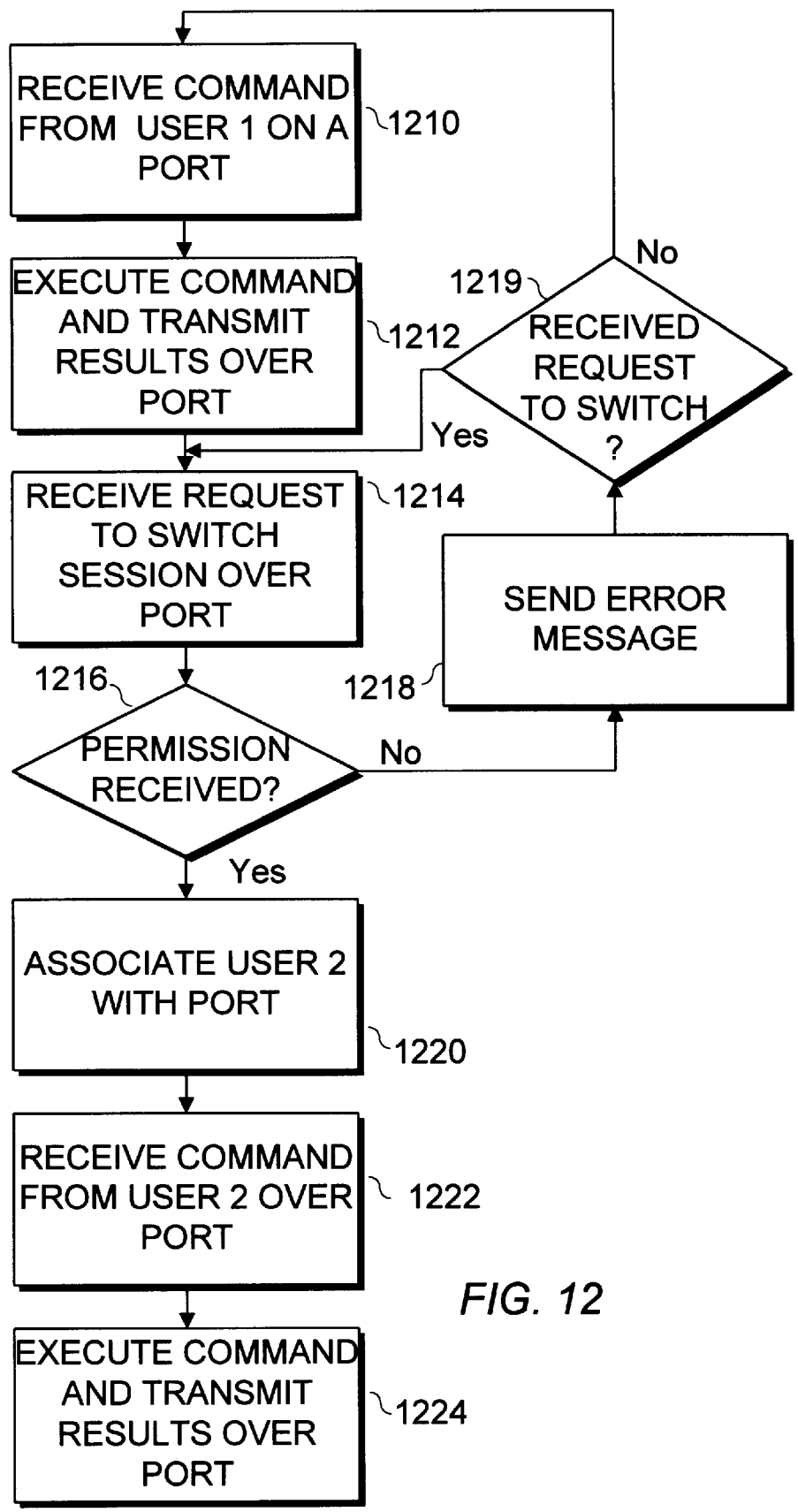
FIG. 12 is a flowchart illustrating a method of executing two server commands from two users according to one embodiment of the present invention.

Referring now to FIG. 12, a method for processing server commands from multiple clients according to one embodiment of the present invention is shown. A command is received from a first user on a port 1210. In one embodiment, the command may be a query or other conventional database command. The command is executed, and any results are transmitted back to the user from whom the command came, in one embodiment, via the same port as was used to receive the command 1212. A request to switch the session associated with the port is received 1214. In one embodiment, the request is received over the same port as described above. In another embodiment, the request to switch the session associated with the port is received over a second port. In one embodiment, if permission such as a release session command has not been received prior to the request to switch the session 1214, an error message is generated, and the method may repeat from step 1210 if another command is received from user 1 or step 1214 if another session switch request is received 1219. An identifier such as a session handle that is associated with a second user is associated with the port formerly associated with the first user 1220. A command is received from the second user over the same port 1222, and the command is executed, and results transmitted to the second user, in one embodiment, via the same port 1224.

Figure 13:
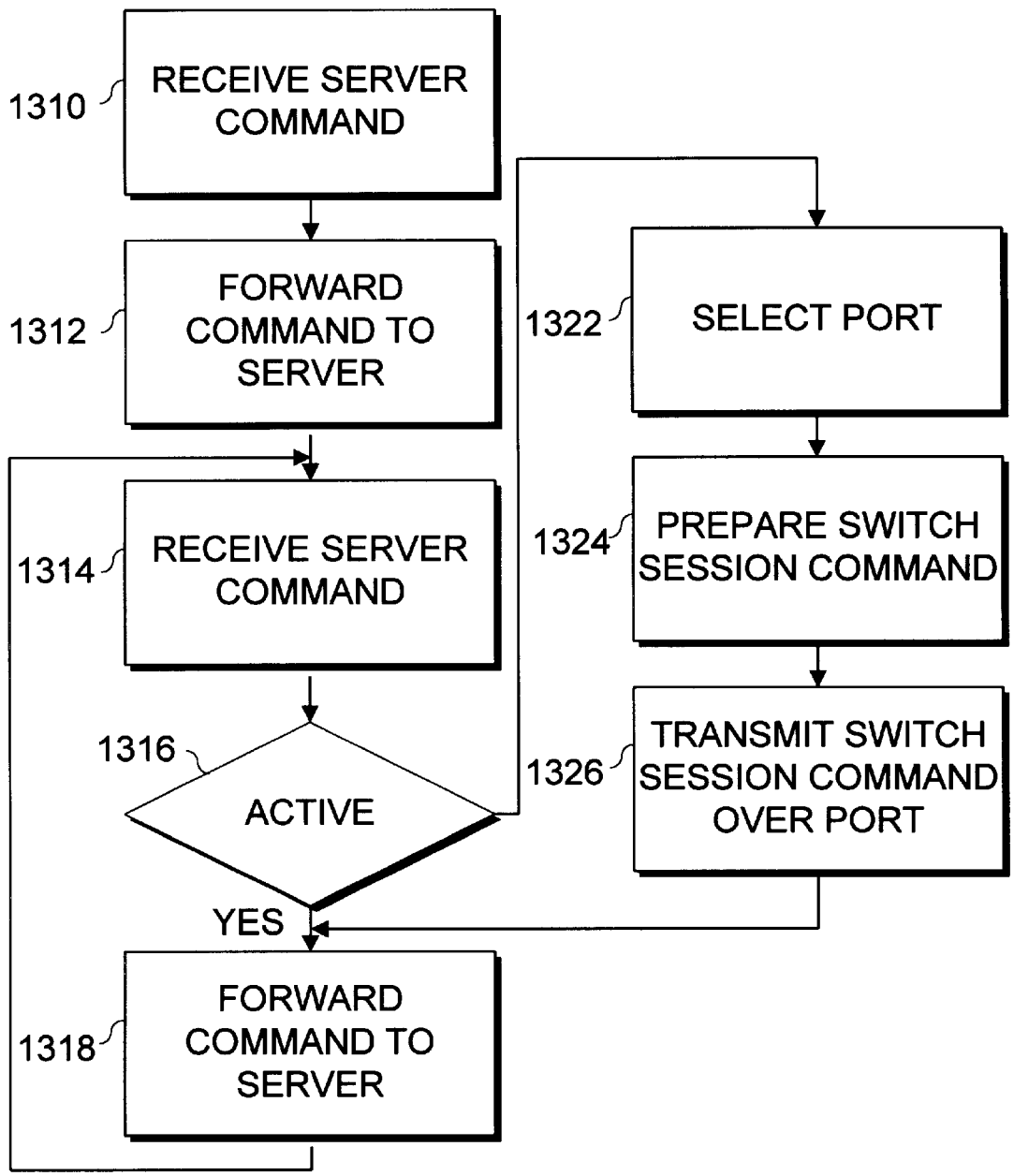
FIG. 13 is a flowchart illustrating a method of forwarding two commands from at least one client to a server according to one embodiment of the present invention.

Referring now to FIG. 13, a method for forwarding commands from two users to a server according to one embodiment of the present invention is shown. A server command is received and forwarded from a user to a server 1310, 1312. After a second server command is received 1314, a determination is made whether the user has an active session 1316. If the server command contains an identifier of a server, the determination is limited to the server corresponding to the identifier. If an active session for that user exists, the command is sent over the port corresponding to the active session 1318. If no active session exists, a port is selected as described above with reference to FIGS. 7, 8 and 9 1322. A switch session command is prepared and transmitted to the server 1324, 1326. In one embodiment, the switch session command is made up of a command granting permission to switch the session such as a release session command, and a command to identify the session to be switched as active such as a command containing the handle of the second session. In another embodiment, release session is not necessary and receipt of a command containing a session handle will cause the session to be switched. The server command received in step 1314 is forwarded to the server 1318. In one embodiment, each of the activities described in steps 1312, 1318 and 1326 takes place over the same server port and the commands received in steps 1310 and 1314 are from two different users. In one embodiment, the method repeats at step 1314 to receive another command from a user.

What is claimed is:

1. A server, comprising:
   a set of at least one port for communicating with at least one device external to the server;
   a session data storage for storing a first number of sets of session data corresponding to a first number of sessions greater than a second number of ports of the server; and
   a session switcher module coupled to at least one of the ports in the set of ports and to the session data storage, the session switcher module for receiving at least one command from at least one port, and responsive to the command:
   associating a first session data set in the session data storage with a port associated with a second session data set in the data storage;
   disassociating the second session data set from the port; and
   preserving the second session data set; and
   wherein the first session data set comprises an identifier of a first user and the second session data set comprises an identifier of a second user.

2. The server of claim 1 additionally comprising at least one active session data storage coupled to the session switcher module to store at least one indicator of at least one session data set associated with one of the ports.

3. The server of claim 1, wherein the port associated with the second data set is coupled to the session switcher module.

4. The server of claim 1, wherein at least the first session data set has a handle identifying the set, and the at least one command received by the session switcher module comprises the handle of the first session data set.

5. The server of claim 1 additionally comprising a session initiator module coupled to at least one port in the set and to the session data storage for receiving a request to initiate a session, causing a portion of the session data storage to be reserved and communicating a handle with at least one of the ports in the set.

6. The server of claim 5, wherein the session initiator module receives from at least one of the ports coupled to said session initiator module the handle and causes the handle received to be associated with the session data storage reserved.

7. The server of claim 5 wherein the session initiator module causes the handle associated with the session data storage received to be transmitted to at least one of the ports coupled to said session initiator module.

8. The server of claim 1 additionally comprising a session information maintainer module coupled to at least one of the ports for receiving a command to designate at least one port as available to be switched, and coupled to the session switcher module for identifying to the session switcher module the at least one port designated.

9. The server of claim 1 additionally comprising a session terminator module coupled to the at least one port for receiving at least one command describing at least one session to be terminated, and coupled to the session data storage for identifying as terminated the session data set corresponding to the session described.

10. A method of executing commands on a server having a port, a first set of session information corresponding to a first client and a second set of session information corresponding to a second client, the method comprising:

receiving a first command over the port;

executing the command received according to the first set of session information;

receiving a request to associate the second set of session information with the port;

associating the second set of session information with the port responsive to the receiving the request step;

disassociating the first set of session information from the port responsive to the receiving the request step;

preserving at least a portion of the first set of session information;

receiving a second command over the port after the receiving the request step; and executing the second command received according to the second set of session information.

11. The method of claim 10 comprising the additional step of copying the first set of session information.

12. The method of claim 10 comprising the additional step of receiving a command granting permission to associate the port with a set of information different than the first set of session information.

13. The method of claim 12 wherein the first and second commands and the command granting permission are received over the port.

14. A computer program product comprising computer readable program code devices configured to cause a computer to executing commands on a server having a port, a first set of session information corresponding to a first client and a second set of session information corresponding to a second client, the computer program product comprising:

computer readable program code devices configured to cause a computer to receive a first command over the port;

computer readable program code devices configured to cause a computer to execute the command received according to the first set of session information;

computer readable program code devices configured to cause a computer to receive a request to associate the second set of session information with the port;

computer readable program code devices configured to cause a computer to associate the second set of session information with the port responsive to the computer readable program code devices configured to cause a computer to receive the request;

computer readable program code devices configured to cause a computer to disassociate at least a portion of the first set of session information from the port responsive to the computer readable program code devices configured to cause a computer to receive the request;

computer readable program code devices configured to cause a computer to preserve at least a portion of the first set of session information;

computer readable program code devices configured to cause a computer to receive a second command over the port after the request is received; and computer readable program code devices configured to cause a computer to execute the second command received according to the second set of session information.

15. The computer program product of claim 14 additionally comprising computer readable program code devices configured to cause a computer to copy the first set of session information.

16. The computer program product of claim 14 additionally comprising computer readable program code devices configured to cause a computer to receiving a command granting permission to associate the port with a set of information different than the first set of session information.

17. The computer program product of claim 16 wherein the first and second commands and the command granting permission are received over the port.

* * * * *